Patented Oct. 7, 1941

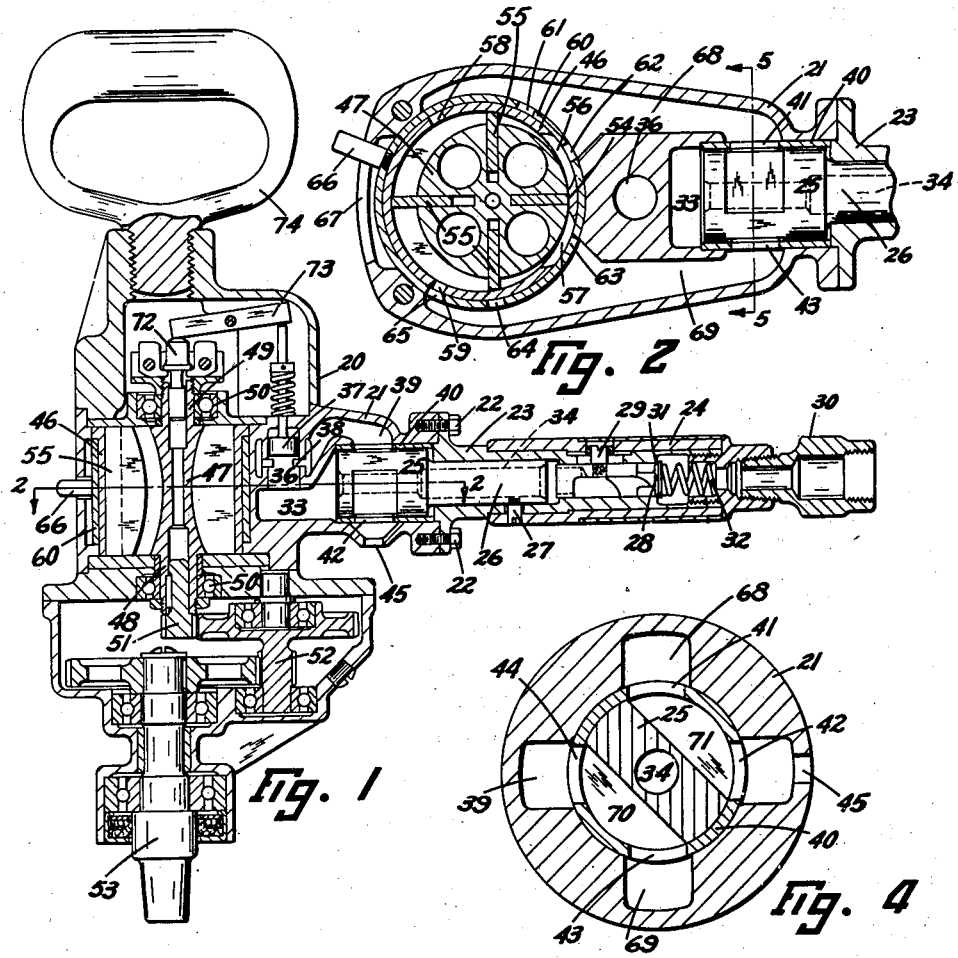

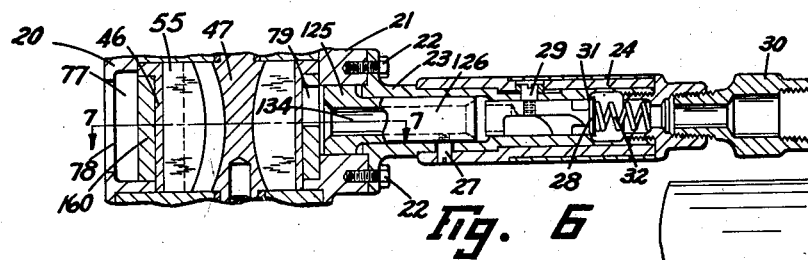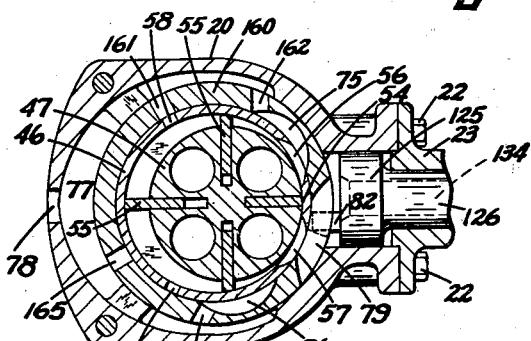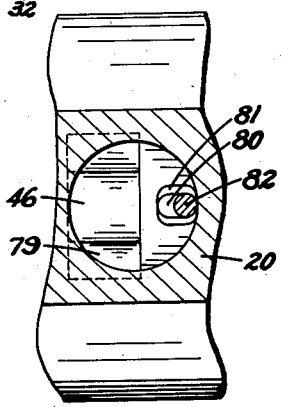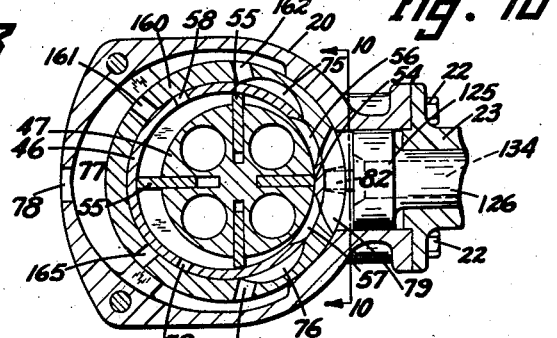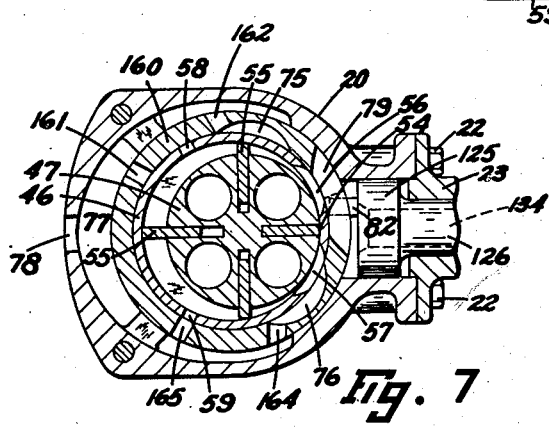

2,257,892

UNITED STATES PATENT OFFICE 2,257,892

REVERSIBLE ROTARY MOTOR

Paul Van Sittert, Cleveland Heights, Lloyd G. Speth, East Cleveland, and John H. Engeln, Cleveland, Ohio, assignors to The Cleveland Pneumatic Tool Company, Cleveland, Ohio, a corporation of Ohio Application February 23, 1939, Serial No. 257,824

4 Claims. (Cl. 121—84)

This invention relates broadly to rotary motors, but more particularly to fluid actuated rotary motors of the reversible type.

One object of this invention is to produce a fluid actuated rotary motor of the reversible type with manually operable means for controlling the direction of rotation of the motor.

Another object of this invention is to construct a fluid actuated rotary motor of the reversible type wherein the parts are arranged and disposed in a manner producing a compact assembly which is strong, durable and efficient.

Other objects and advantages more or less ancillary to the foregoing reside in the specific construction and aggroupment of the elements peculiar to this structure, as will become apparent from a more complete examination of this specification.

In the drawings:

Fig. 1 is a longitudinal elevational sectional view of a rotary motor embodying the invention.

Fig. 2 is an enlarged sectional view taken in a plane indicated by line 2—2 in Fig. 1.

Fig. 3 is a view similar to Fig. 2 with some of the movable parts shown in a different position.

Fig. 4 is an enlarged cross sectional view taken in a plane indicated by line 4—4 in Fig. 3.

Fig. 5 is an enlarged cross sectional view indicated by line 5—5 in Fig. 2.

Fig. 6 is a fragmentary sectional view of a motor embodying a modification of the invention.

Fig. 7 is an enlarged sectional view taken in a plane indicated by line 7—7 in Fig. 6.

Figs. 8 and 9 are views similar to Fig. 7, illustrating some of the movable parts in a different position.

Fig. 10 is an enlarged cross sectional view taken in a plane indicated by line 10—10 in Fig. 9.

Referring to the drawings, 20 represents the main motor housing having a lateral extension 21 to which is secured by cap screws 22 a handle 23 extending laterally from the motor and having a handle grip 24 rotatable thereon. Rotatable within the extension 21, there is a valve 25 having a stem 26 extending into the handle 23, which stem is secured to the handle grip 24 by a screw 27 movable within a slot provided through the handle 23. In the handle 23, there is also a throttle valve 28 operatively associated with the handle grip 24 through a pin connection 29 arranged and disposed in a manner causing longitudinal movement of the throttle valve 28 upon rotary movement of the handle 24. The handle 23 is terminated by a motive fluid connection 30 through which motive fluid may be admitted into the handle where its admission into the motor is controlled by the throttle valve 28 which is normally maintained against a valve seat 31 by a compression spring 32. From the throttle valve 28 motive fluid may be admitted into an inlet chamber 33 formed within the motor housing 20 via an inlet passage 34 provided through the valve 25.

Opening into the inlet chamber 33, there is a passage 36 controlled by a centrifugally operated governor valve 37 movable into open or closed position relative to an annular groove 38 affording communication between the passage 36 and an inlet passageway 39 formed within the extension 21 and controlled by the valve 25, which valve is rotatably mounted within a bushing 40 provided with four equally spaced radial extending ports 41, 42, 43 and 44, the port 44 being in constant communication with the passageway 39, while the port 42 is in communication with an exhaust port 45.

Vertically disposed within the housing 20, there is a stator in the form of a cylindrical sleeve 46 having rotatable therein a rotor 47 formed with shafted end portions 48 and 49, each journaled within an adequate bearing 50, the end portion 48 being provided with a pinion 51 coupled through a train of gears 52 with a tool carrying spindle 53, which spindle extends from the lower end of the casing 20 to receive the tool intended to be rotated by the motor. The rotor 47 is mounted eccentrically relative to the center axis of the stator 46 in line contact with the inner wall thereof as at 54 and carries radially movable vanes 55 capable of operative engagement with the inner wall of the stator 46, which stator is formed with two inlet grooves 56 and 57, one located on each side of the bearing line 54 and two exhaust ports 58 and 59, one located on each side of the bearing line 54 in equal spaced relation therewith. Surrounding the stator 46, there is an exhaust controlling sleeve 60 rotatably mounted on the stator and formed with conveniently disposed radially extending ports 61, 62, 63, 64 and 65, which ports together with the several ports provided through the stator 46 may in practice be replaced by vertically disposed elongated slots or their equivalent. Secured to the sleeve 60, there is a pin or handle 66 projecting to the exterior of the motor housing 20 through a slot 67 provided through the adjacent wall of the housing.

Leading from the port 41 of the valve bushing 40 to the stator 46, there is a passageway 68, and from the similar port 43 also to the stator, there is a passageway 69, while the peripheral wall of the valve 25 is provided with two diametrically opposed slots 70 and 71, the purpose of which will be explained later.

In the upper end of the motor housing 20, there is accommodated a centrifugal governor 72 operatively associated with the governor valve 37 through a lever 73, while the housing 20 is terminated by a handle 74.

In the modified construction shown in Figs. 6 to 10 inclusive, the exhaust controlling sleeve 60 has been replaced by similar sleeve 160 rotatable relative to the stator 46, which sleeve is provided with radially disposed ports 161, 162, 164 and 165, the port 162 opening into a semicircular recess 75 and the port 164 into a similar recess 76. Extending partly around the sleeve 160, there is provided within the housing 20 an exhaust chamber 77 leading to the atmosphere through an exhaust port 78. Adjacent the bearing line 54 between the rotor and the stator, the sleeve 160 is provided with an inlet slot 79 and below this slot with a longitudinally disposed elongated slot 80 having inward tapered side walls 81. Within the slot 80 projects a pin 82 carried by the head 125 of a stem 126 rotatably mounted within the handle 23 and connected to the handle grip 24 by the screw 27. The pin 82 is mounted in the head 125 in eccentric relation with the center axis thereof, while the stem 126 is provided with a central inlet port 134 through which motive fluid from the throttle valve 28 is admitted to the sleeve's inlet slot 79. In this last construction, it will be understood that the governor valve 38 together with the governor mechanism 72 have been omitted and that the admission of the air or motive fluid from the inlet connection 30 is only controlled by the throttle valve 28.

In the operation of the device, with the construction shown in Figs. 1 to 5 inclusive, the throttle valve 28 may be moved into open position relative to the valve seat 31 against the compression spring 32 by simply rotating the handle grip 24 in one or the other direction, thereby rotating the valve 25 connected to the handle grip 24 by the screw 27 into the position shown in Fig. 4 or 5, thus admitting motive fluid into the inlet chamber 33 through the port 26 of the valve 25, which will act on the governor valve 37 to shift it into open position as shown in Fig. 1 and enable admission of the motive fluid into the passageway 39 via the groove 38. This longitudinal movement of the throttle valve 28 upon rotary movement of the handle grip 24 is obtained by virtue of a helical groove formed within the handle within which is mounted the screw 29 connecting the handle grip to the throttle valve, and since that construction does not form a part of the present invention, no further description of the same is thought necessary.

With the valve 25 positioned as shown in Fig. 5, and the sleeve 60 positioned as shown in Fig. 2, the motive fluid from the passageway 39 will flow into the passageway 68 via the port 44, the valve slot 70 and the port 41, and from the passageway 68 into the stator 46 via the sleeve port 62 and the stator inlet port 56. Once in the stator 46, motive fluid will act on the vanes 55 for imparting rotation to the rotor 47 in a counter-clockwise direction in Fig. 2. In this instance, the exhaust port 58 is closed by the sleeve 60, while the exhaust port 59 registers with the sleeve port 65 and stator-port 57 registers with the sleeve-port 63, which ports 59 or 63 open into the passageway 69 now in communication with the exhaust port 45 through the bushing port 43, the valve slot 71 and the bushing port 42.

When it is desired to impart rotation to the rotor 47 in the other direction, the handle grip 24 may be rotated for positioning the valve 25 into the position shown in Fig. 4. Simultaneously the operator will shift the pin 66 from the position shown in Fig. 2 to the position shown in Fig. 3 thereby rotating the sleeve 60 into the position shown in Fig. 3. In this instance, the motive fluid from the passageway 39 will flow into the passageway 69 via the bushing port 44, the valve slot 70 and the bushing port 43. From the passageway 69 motive fluid will be admitted into the stator 46 via the sleeve port 64 and inlet groove 57, thereby acting on the vanes 55 for imparting rotation to the rotor in a clockwise direction in Fig. 3. In this instance, the stator exhaust port 59 is closed by the sleeve 60, while the exhaust port 58 registers with the sleeve port 61 and the groove 56 with the sleeve port 63, which ports 61 and 63 open into the passageway 68 now in communication with the exhaust port 45 through the bushing port 41, the valve slot 71 and the bushing port 42.

From the foregoing description, it will be understood that by rotating the valve 25 and independently rotating the sleeve 60 in the position shown in Fig. 2 or 3, it is possible to control the direction of the rotation of the rotor, which rotation is transmitted to the spindle 53 by the gear train 52. In this construction, the control of the exhaust ports 58 and 59 is accomplished by individual rotation of the sleeve 60 relative to the valve 25, while in the other two modifications of the invention, this exhaust control is effected by the simple manipulation of the valve corresponding to the valve 25.

In the construction shown in Figs 6 to 10 inclusive, when the stem 126 is positioned as shown in Fig. 9, the throttle valve 28 will normally remain closed relative to the valve seat 31, thereby preventing admission of the motive fluid into the stator 46. When the stem 126 is rotated into the position shown in Fig. 7, the pin 82 mounted eccentrically relative to the center axis of the stem 126 and located within the slot 80 of the sleeve 160 will cause rotation of the sleeve into the position shown in Fig. 7. In this instance, the motive fluid admitted through the stem inlet port 134 will flow into the stator 46 via the sleeve slot 79 and the stator slot 56 to act on the vanes 55 for imparting rotation to the rotor 47 in a counter-clockwise direction in Fig. 7. In this instance, the stator exhaust port 58 is closed by the sleeve 160, while the stator ports 59 and 57 are in registration with the sleeve port 165 and 164 respectively, which ports open into the exhaust recess 77 in communication with the atmosphere through the exhaust port 78, thereby enabling exhaust of the motive fluid from the rear end portion of the stator 46 relative to the bearing line 54 between the rotor and stator. When it is desired to impart rotation to the rotor 47 in the other direction, the stem 126 may be rotated into the position shown in Fig. 8, in which instance, the sleeve slot 79 is in communication with the stator slot 57 for admitting motive fluid into the stator for causing rotation of the rotor 47 in a clockwise direction in Fig. 8. In this position of the sleeve 160, the stator exhaust port 59 is closed by the sleeve while its port 58 and slot 56 are in communication with the exhaust recess 77, the former through the sleeve port 161 and the latter through a similar port 162.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

We claim:

1. In a fluid actuated rotary motor of the reversible type, the combination of a stator having a rotor chamber, a rotor operatively mounted in said chamber, and means for admitting and exhausting motive fluid into and from said chamber including a sleeve surrounding said stator in fluid tight engagement therewith, two sets of ports through said sleeve and stator each set including an inlet and an outlet port opening into said chamber, said sleeve being rotatable on said stator for moving one of its sets of ports into and the other set out of communication with the corresponding sets of ports of said stator.

2. In a fluid actuated rotary motor of the reversible type, the combination of a stator having a rotor chamber, a rotor operatively mounted in said chamber, radially movable vanes carried by said rotor operatively engaging said stator, a sleeve surrounding said stator in fluid tight engagement therewith, means for admitting and exhausting motive fluid into and from said chamber including ports through said stator and sleeve, said sleeve being rotatable for selectively moving some of its ports into communication with some ports of said stator for admitting motive fluid to and exhausting it from one or the other side of said vanes resulting in the rotation of said rotor in one or the other direction.

3. In a fluid actuated rotary motor of the reversible type, the combination of a stator having a rotor chamber, a rotor operatively mounted in said chamber, means for admitting and exhausting motive fluid into and from said chamber including inlet and outlet ports through said stator, a sleeve valve rotatable on said stator for controlling said ports, a throttle valve for controlling admission of the motive fluid to said sleeve valve, and single operating means for said valves associated with said sleeve valve to rotate the same and with said throttle valve to keep it open during predetermined positions of said sleeve valve.

4. In a fluid actuated rotary motor of the reversible type, the combination with a casing, of a stator within said casing having a rotor chamber, a rotor within said chamber carrying vanes operatively engaging said stator, a pair of passageways in said casing leading to said stator, a valve for selectively controlling admission of motive fluid to one or the other of said passageways, an inlet and an outlet port through said stator connecting said chamber to each of said passageways, and a sleeve valve rotatable on said stator into opened or closed positions relative to one or the other of said outlet ports, said sleeve valve when in either of said positions enabling communication of said inlet ports with said passageways.

PAUL VAN SITTERT.
LLOYD G. SPETH.
JOHN H. ENGELN.